United States Patent
Mendo Hernandez

(10) Patent No.: US 11,416,455 B2
(45) Date of Patent: Aug. 16, 2022

(54) VERSION CONTROL OF ELECTRONIC FILES DEFINING A MODEL OF A SYSTEM OR COMPONENT OF A SYSTEM

(71) Applicant: The Boeing Company, Chicago, IL (US)

(72) Inventor: Juan Carlos Mendo Hernandez, Salamanca (ES)

(73) Assignee: The Boeing Company, Chicago, IL (US)

( * ) Notice: Subject to any disclaimer, the term of this patent is extended or adjusted under 35 U.S.C. 154(b) by 543 days.

(21) Appl. No.: 16/424,939

(22) Filed: May 29, 2019

(65) Prior Publication Data
US 2020/0379956 A1    Dec. 3, 2020

(51) Int. Cl.
G06F 16/18    (2019.01)
G06F 16/13    (2019.01)
G06F 16/11    (2019.01)

(52) U.S. Cl.
CPC ........ G06F 16/1873 (2019.01); G06F 16/116 (2019.01); G06F 16/13 (2019.01)

(58) Field of Classification Search
CPC ..... G06F 16/1873; G06F 16/116; G06F 16/13
USPC ......................................................... 707/756
See application file for complete search history.

(56) References Cited

U.S. PATENT DOCUMENTS

| | | | | |
|---|---|---|---|---|
| 8,977,636 | B2* | 3/2015 | Bodin | G06F 16/958 |
| | | | | 707/756 |
| 9,864,752 | B2* | 1/2018 | Lim | G06F 16/93 |
| 2007/0168382 | A1* | 7/2007 | Tillberg | G06F 16/93 |
| | | | | 707/E17.084 |
| 2012/0109987 | A1* | 5/2012 | Broussard | G06F 16/176 |
| | | | | 707/754 |
| 2014/0032505 | A1* | 1/2014 | Grafi | G06F 16/116 |
| | | | | 707/691 |
| 2016/0132572 | A1* | 5/2016 | Chang | G06F 16/243 |
| | | | | 707/723 |
| 2019/0286827 | A1* | 9/2019 | Chang | G06F 16/176 |

OTHER PUBLICATIONS

"Zippey a Git filter for friendly handling of ZIP-based files;" accessed at: sippey / Zippey—Bitbucket (archive.org); captured by Wayback Machine at archive.org on Jan. 2, 2015.*
git-scm.com, Git fast version control; retrieved from the following website on May 16, 2019: https://git-scm.com/book/en/v2/Customizing-Git-Git-Attributes, 7 pages.*

(Continued)

*Primary Examiner* — Giovanna B Colan
(74) *Attorney, Agent, or Firm* — Sage Patent Group

(57) ABSTRACT

A method for controlling versions of a model file includes determining a format of a particular element of a plurality of elements of the model file. The model file defines a model of a system. The method also includes converting the particular element of the plurality of elements from a non-text format to a text-based format in response to the particular element including data in the non-text format. The method further includes writing the particular element converted to the text-based format to a model text file. The model text file is a text-based version of the model file and the model text file is used to detect changes in the model file and to control different versions of the model file.

18 Claims, 12 Drawing Sheets

(56) References Cited

OTHER PUBLICATIONS

"Zippey a Git filter for friendly handling of ZIP-based files;" captured by Wayback Machine at archive.org on Jan. 2, 2015.*
bitbucket.org, Zippey: A Git filter for friendly handling of ZIP-based files; retrieved from the following website on May 16, 2019: https://bitbucket.com/org/sippey/zippey.git, 2 pages.

* cited by examiner

```
function [text] = cleanSSP (sspIn)
#   Pre-process ssp and create temporal xml
zipFile=createTempZip(sspIn);
text = createTempXml ();
for elem=1:zipFile.namelist()
    #   Get zip element meta information
    elemData = zipFile.read(elem);
    elemFormat = getFnormat(elem);
    if elemFormat == {'.xml'  '.html'  '.txt' }
        #   For text based elements write "as is" in xml
        text.write (elemData);
    elseif elemFormat == {  '.fmu' }
        #   For an FMU within an SSP use "cleanFMU"
        elemData = cleanFMU (elemData);
        text.write (elemData);
    else
        #   For binary elements perform binary-to-text encoding
        #   into xml
        elemData = encondeLib.encode (elemData);
        text.write (elemData);
    end
end
```

FIG. 4A
205

```
function [text] = cleanFMU (fmuIn)
#   Pre-process fmu and create temporal xml
zipFile=crateTempZip (fmuIn);
text "createTempXml ();
for elem=1:zipFile.namelist()
    #   Get zip element meta information
    elemData = zipFile.read(elem);
    elemFormat = getFnormat(elem);
    if elemFormat == { '.xml'  '.html'  '.txt')
        #   For text based elements write "as is" in xml
        text.write (elemData);
    else
        #   For binary elements perform binary-to-text encoding
        #   and write encoded
        #   into xml
        elemData = encondeLib.encode(elemData);
        text.write (elemData);
    end
end
```

FIG. 4B
238

```
function [sspOut] = smudgeSSP (text)                                304
    Pre-process text and create temporal ssp
sspOut=createTempZip ();
metaInfo = readSection (text);
while metaInfo > 0
    textSection = isText (metaInfo);
    fmuSection = isFMU (metaInfo);
    if textSection
        For text based sections from the xml write directly a new element in
        the zip
            sspOut.writeStr (metaInfo);
    elseif fmuSection
        for an FMU within an SSP use "smudgeFMU"
        metaInfo = smudgeFMU (metaInfo);
        sspOut.writeStr (metaInfo);
    else
        For binary-encoded sections from the xml, first decode and then write
        a new element
        metaInfo = encondeLib.decode (metaInfo);
        sspOut.writeStr (metaInfo);
    end
end
```

FIG. 5A

```
function [fmuOut] = smudgeFMU (text)
    Pre-process text and create temporal fmu
fmuOut=createTempZip();
metaInfo = readSection (text);
while metaInfo > 0
        textSection = isText (metaInfo);
        if textSection
            For text based sections from the xml write directly a new element in
            the zip
                fmuOut.writeStr (metaInfo);
        else
            For binary-encoded sections from the xml, first decode and then write
            a new element
            metaInfo = encondeLib.decode (metaInfo);
            fmuOut.writeStr (metaInfo);
        end
end
```

FIG. 5B

VERSION CONTROL OF ELECTRONIC FILES DEFINING A MODEL OF A SYSTEM OR COMPONENT OF A SYSTEM

FIELD

The present disclosure relates to model-based development of a system and more particularly to controlling versions of electronic files defining a model of the system or component of the system.

BACKGROUND

In development of a complex apparatus, for example an aircraft, automobile, or other complex apparatus, using Model-Based System Engineering (MBSE), the different systems included in the complex apparatus are defined in models embodied in electronic files. The models of the different systems are exchanged between different entities involved in the development, such as an Original Equipment Manufacturer (OEM) and the OEM's suppliers, in model packages. The electronic files in the model packages include different types of model electronic files. Examples of different types of model electronic files include Systems Modeling Language (sysML) models, Functional Mock-up Unit (FMU) models, System Structure and Parameterization (SSP) models, Simulink models, etc. Additionally, documents such as requirements documents, contractual agreements, etc., are also embodied in electronic files that are exchanged between the entities. Functional Mock-up Interface (FMI) and SSP are key enablers to the OEM-supplier model-based collaboration due to their interoperability, flexible Internet Protocol (IP) protection, scalability and reusability features. However, such model packages and the sub-packages inside them, for example SSPs and FMUs, are not configuration control friendly, meaning that configuration control systems, such as Git and Apache Subversion (SVN), treat the entire model package as a single binary file, and configuration control systems are not able to treat the model packages as regular directories and subdirectories for version control by a version control system. Accordingly, changes at the element and sub-element level within the model packages are unable to be tracked and it cannot be determined if an element or sub-element within the model package was modified, who performed that modification and when.

SUMMARY

In accordance with an embodiment, a method for controlling versions of a model file include determining, by a processor, a format of a particular element of a plurality of elements of the model file. The model file defines a model of a system. The method also includes converting, by the processor, the particular element of the plurality of elements from a non-text format to a text-based format in response to the particular element including data in the non-text format. The method also includes writing, by the processor, the particular element converted to the text-based format to a model text file. The model text file is a text-based version of the model file and the model text file is used to detect changes in the model file and to control different versions of the model file.

In accordance with another embodiment, a method for controlling versions of a model file include receiving the model file, by a processor, that defines a model of a system. The model file includes a plurality of elements. The method also includes determining, by the processor, a format of a particular element of the plurality of elements in the model file. The method additionally includes writing, by the processor, the particular element of the plurality of elements into a model text file in response to the particular element including data in a text format. The method additionally includes converting, by the processor, the particular element of the plurality of elements from a non-text format to a text-based format in response to the particular element including data in the non-text format. The method further includes writing, by the processor, the particular element converted to the text-based format to a model text file. The model text file is a text-based version of the model file and the model text file is used to detect changes in the model file and to control different versions of the model file.

In accordance with another embodiment, a system for controlling versions of a model file includes a processor and a memory associated with the processor. The memory includes computer readable program instructions that, when executed by the processor cause the processor to perform a set of functions including determining a format of a particular element of a plurality of elements of the model file. The model file defines a model of a system. The set of functions also include converting the particular element of the plurality of elements from a non-text format to a text-based format in response to the particular element including data in the non-text format. The set of functions further include writing the particular element converted to the text-based format to a model text file. The model text file is a text-based version of the model file and the model text file is used to detect changes in the model file and to control different versions of the model file.

In accordance with an embodiment and any of the preceding embodiments, the method and system also include writing the particular element of the plurality of elements into the model text file in response to the particular element comprising data in a text format.

In accordance with an embodiment and any of the preceding embodiments, the method and system also include retrieving metadata associated with the model file. The metadata includes at least one of an element name, an element description, a date of creation, a date of modification, an identification of a version, or an identification of an author.

In accordance with an embodiment and any of the preceding embodiments, wherein retrieving the metadata further includes retrieving a specific model metadata, a specific model implementation, model usage and model execution metadata associated with the model file. A specific model metadata includes at least one of an element validity range, a fidelity, a plurality of ports and parameters, start and initial conditions, a physical domain, a validation level, a model execution environment, a set of solver settings, a group of external libraries, a set of real-time computation settings, an implementation language, an implementation tool, and a compiler.

In accordance with an embodiment and any of the preceding embodiments, the method and system further include performing a diff operation on the model text file to detect any change to the particular element by comparing to a previous version of the particular element.

In accordance with an embodiment and any of the preceding embodiments, the method and system additionally include storing the model text file in a local repository.

In accordance with an embodiment and any of the preceding embodiments, the method and system additionally include performing a remote commit operation. Performing the remote commit operation includes pushing the model text file and associated metadata to a remote repository and storing the model text file and the associated metadata on the remote repository.

In accordance with an embodiment and any of the preceding embodiments, the method and system additionally include providing access to remote users to view changes to the model file based on the model text file including remote users that do not have smart filters available.

In accordance with an embodiment and any of the preceding embodiments, wherein the model file includes a system structure and parameterization (SSP) file and wherein writing each element of the plurality of elements into the model text file includes performing a cleanSSP process.

In accordance with an embodiment and any of the preceding embodiments, wherein performing the cleanSSP process includes using a conversion script to convert the particular element from the non-text format to the text-based format in response to the particular element including data in the non-text format.

In accordance with an embodiment and any of the preceding embodiments, wherein the model file includes a functional mockup unit (FMU) file and wherein writing each element of the plurality of elements into the model text file includes performing a cleanFMU process.

In accordance with an embodiment and any of the preceding embodiments, wherein performing the cleanFMU process includes using a conversion script to convert the particular element from the non-text format to the text-based format in response to the particular element including data in the non-text format.

In accordance with an embodiment and any of the preceding embodiments, the method and system further include checking-out the model text file and associated metadata from a repository and converting the model text file to a converted model file. The converted model file comprises at least one element including data in the non-text format. The method and system additionally include modifying the converted model file to provide a modified model file. The method and system further include converting the modified model file to a new model text file. The new model text file is used to detect changes in the new model text file by comparing the new model text file to a previous version of the model text file and the new model text file is used to control the different versions of the model file.

In accordance with an embodiment and any of the preceding embodiments, wherein converting the model text file includes performing a smudgeSSP process. Performing the smudgeSSP process comprises using a conversion script to convert at least portions the model text file to corresponding portions of the converted model file.

In accordance with an embodiment and any of the preceding embodiments, wherein converting the model text file includes performing a smudgeFMU process, and wherein performing the smudgeFMU process includes using a conversion script to convert at least portions of the model text file to corresponding portions of the converted model file.

In accordance with an embodiment and any of the preceding embodiments, the method and system also include determining if the element is a sub-element of the element and converting the sub-element from the non-text format to the text-based format in response to the sub-element including data in the non-text format. The method and system additionally include writing the sub-element converted to the text-based format to the model text file.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 4A is a pseudocode implementation of a cleanSSP process in accordance with an embodiment of the present disclosure.

FIG. 4B is a pseudocode implementation of a cleanFMU process in accordance with an embodiment of the present disclosure.

FIG. 5A is a pseudocode implementation of a smudgeSSP process in accordance with an embodiment of the present disclosure.

FIG. 5B is a pseudocode implementation of a smudgeFMU process in accordance with an embodiment of the present disclosure.

DETAILED DESCRIPTION

Figure 1:
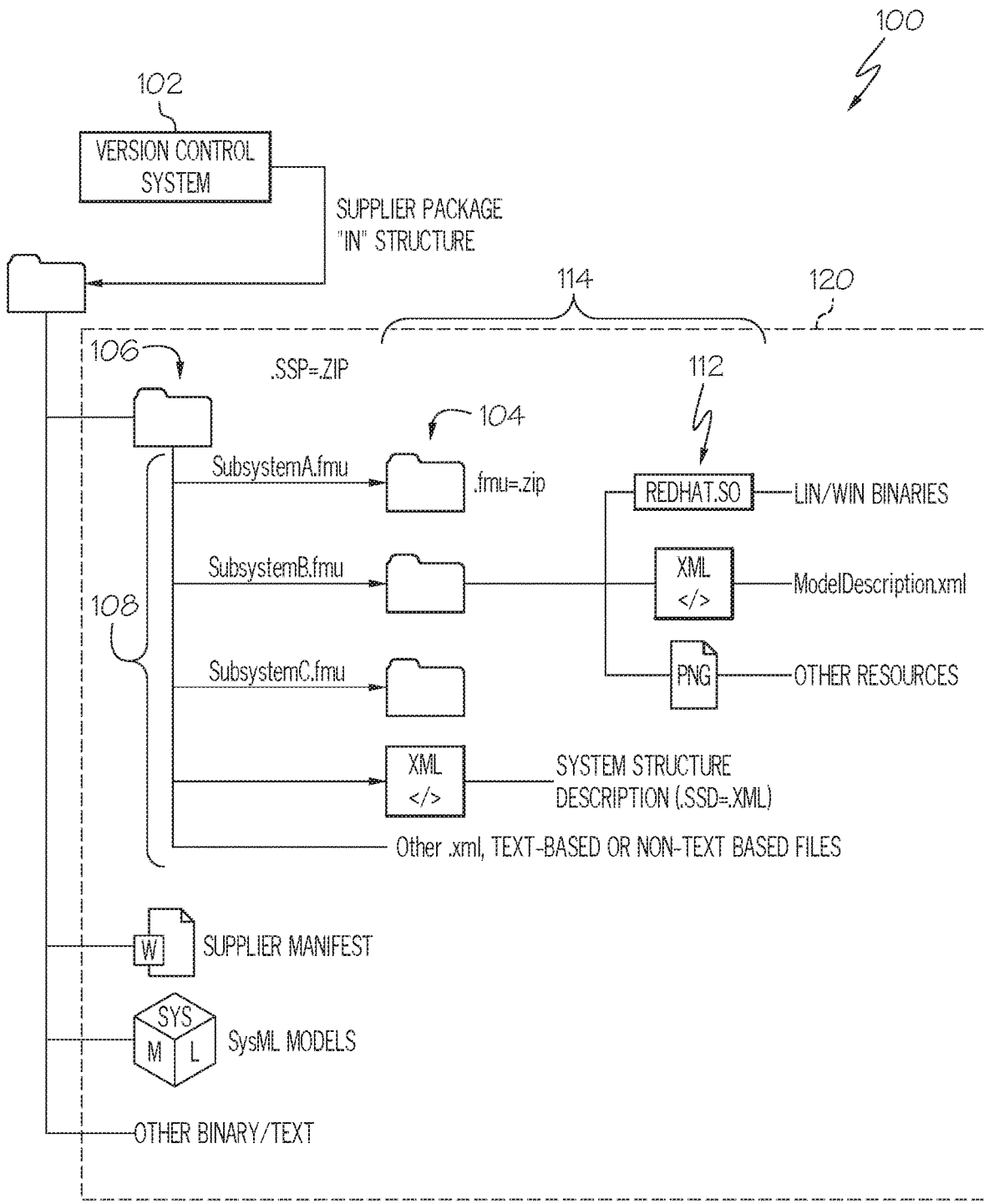
FIG. 1 is an example of an in-package structure containing FMU and SSP packages from a user of a version control system in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 is an example of a supplier in-package 100 structure containing SSP model files 106 and FMU files 104 from a user of a version control system 102 in accordance with an embodiment of the present disclosure. Examples of the version control system 102 include Git, SVN or any type version control system capable of tracking changes to a text-based file as described herein.

This disclosure uses FMU files 104 and SSP model files 106 as examples and is not intended to be limited to any particular types of model electronic files. Those skilled in the art will recognize that the features and operations described herein would be applicable to detecting changes and controlling versions of other types of electronic compressed files (such as, but not limited to .ZIP, .SITX, .7Z or .RAR). In accordance with an example, each of the FMU files 104 includes one or more FMU elements 112. In accordance with an example, each SSP model file 106 includes multiple SSP elements 108. SSP elements 108 can also be FMU files 104 that contain SSP sub-elements 114 or FMU elements 112. In accordance with an embodiment, a model file 120 can be a supplier in-package 100. This is the example shown in FIG. 1, however a model file 120 can also refer to an SSP model file 106 or an FMU file 104.

Figure 2A:
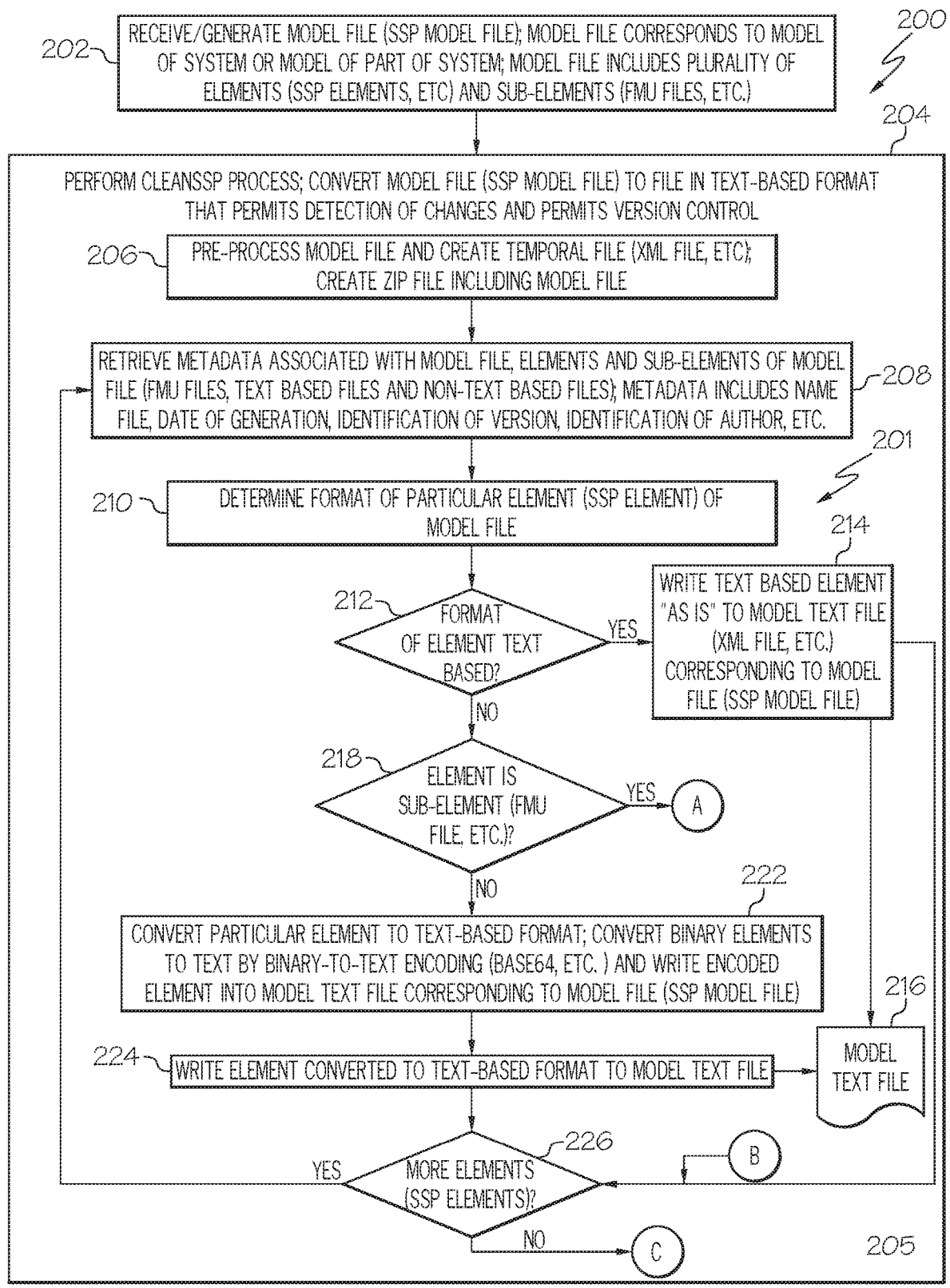
FIGS. 2A-2C are a flow chart of an example of a method for performing a clean process for controlling versions of a model file in accordance with an embodiment of the present disclosure.
Figure 2B:
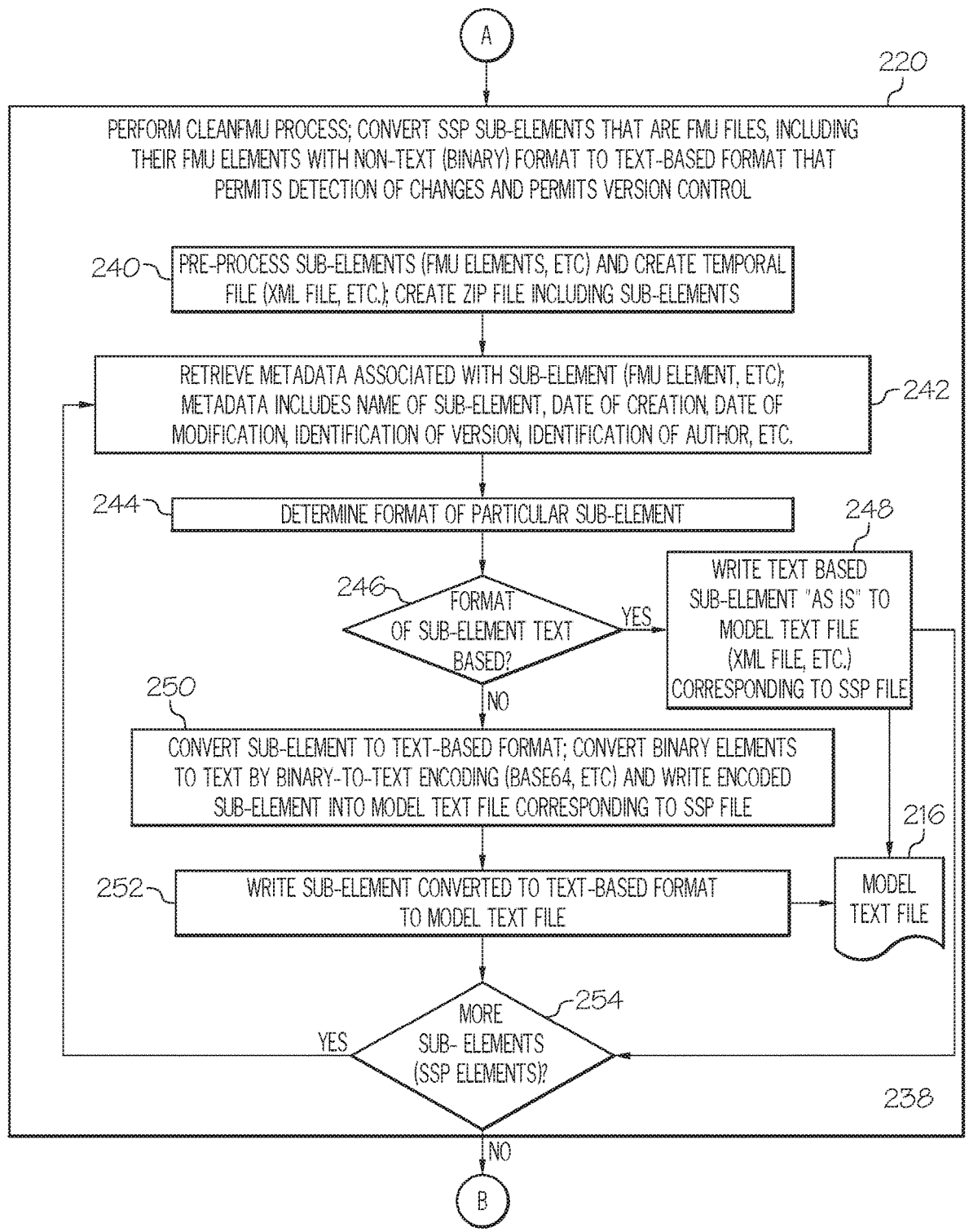
Figure 2C:
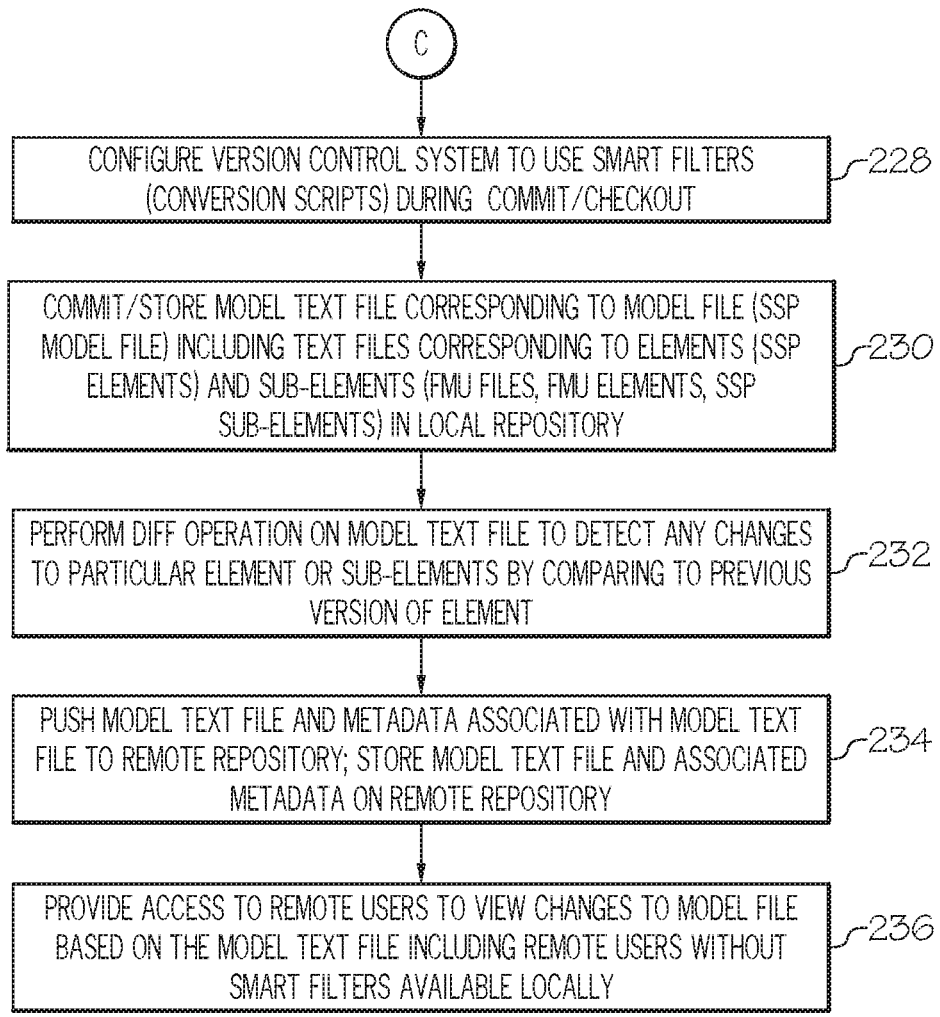

FIGS. 2A-2C are a flow chart of an example of a method 200 for performing a clean process 201 for controlling versions of an SSP model file 106 in accordance with an embodiment of the present disclosure. Specifically, FIGS. 2A-2C show the application of the clean process 201 to an SSP model file 106. In block 202, an SSP model file 106 is received. The SSP model file 106 may also be generated for the first time by a user and received by a system for controlling versions of a model file, for example system 600 in FIG. 6A. In accordance with an example, the SSP model file 106 corresponds to a model of a system, for example a system of an aircraft, automobile or other complex apparatus. In accordance with another example, the SSP model file 106 corresponds to a part of a system. As previously described, in accordance with the example in FIG. 1, the SSP model file 106 includes multiple SSP elements 108 and SSP sub-elements 114, these can be FMU files 104 and FMU elements 112 respectively.

In block 204, the SSP model file 106 is converted to a file in a text-based format that permits detection of changes and permits version control. An example of converting the SSP model file 106 to a text-based format is performing a cleanSSP process 205 in block 204. As previously described, the SSP model file 106 includes multiple SSP elements 108. Each of the SSP elements 108 of the SSP model file 106 is written into the model text file 216 by performing the cleanSSP process 205 in block 204. The model text file 216 permits detection of changes and permits version control. As described in more detail below, the cleanSSP process 205 can be implemented in a version control system via a conversion script, for example cleanSSP process 205 (FIG. 4A), to convert a particular element 108 (SSP element 108) from a non-version control (non-text or binary format to a version control friendly text-based format in response to the particular element 108 including data in the non-text format.

Referring also to FIG. 4A, FIG. 4A is a pseudocode implementation of a cleanSSP process 205 in accordance with an embodiment of the present disclosure. Referring back to FIG. 2A, in block 206, the SSP model file 106 is preprocessed and a temporal file is created. This step is to produce a raw text based template, for example in Extensible Mark-up Language (.xml) format, that is configuration control friendly and includes already prepared various sections according to the number and content of the SSP elements 108. This raw text-based file is later populated with actual information. Preprocessing the SSP model file 106 also includes creating a zip file including the SSP model file 106.

In block 208, metadata associated with the SSP model file 106 is retrieved. Retrieving metadata associated with the SSP model file 106 also includes retrieving metadata associated with elements and sub-elements of the SSP model file 106. In accordance with the example of FIG. 1, the elements and sub-elements include SSP elements 108, some of the SSP elements 108 are FMU files 104, and SSP sub-elements 114, that are also FMU elements 112. The metadata includes at least one of an element name, an element description, a date of creation, a date of modification, an identification of a version, or an identification of an author.

In block 210, a format of a particular element 108, for example an FMU file 104, is determined. In block 212, a determination is made if the format of the particular element 108 is text based. If the format of the particular element 108 is text based, the method 200 advances to block 214. In block 214, the text based particular element 108 is written "as is" to a model text file 216 corresponding to the SSP model file 106 in response to the particular element 108 including data in a text format. If the format of the particular element 108 is not text based, the method 200 advances to block 218.

In block 218, a determination is made if the particular element 108 is an FMU file 104. If the particular element 108 is an FMU file 104, the method 200 advances to block 220 (FIG. 2B). In block 220, an SSP sub-element 114 in a non-text (binary) format is converted to a text-based format as described in more detail below with reference to FIG. 2B. In accordance with an embodiment, converting the SSP sub-element 114 to the text-based format includes performing a cleanFMU process 238 in block 220.

If the particular element 108 is an SSP element 108 that is not an FMU file 104, the method 200 advances to block 222. In block 222, the particular element 108 of the plurality of elements 108 is converted from a non-text (binary) format to a text-based format in response to the particular element 108 including data in the non-text format. In accordance with an example, non-text (binary) elements are converted to text by binary-to-text encoding. For example, Base64 or a similar binary-to-text application is used to perform binary-to-text encoding.

In block 224, the particular element 108 converted to the text-based format (encoded element) is written to a model text file 216. The model text file 216 is a text-based version of the SSP model file 106 and the model text file 216 is used to detect changes in the SSP model file 106 and to control different versions of the SSP model file 106.

In block 226, a determination is made if there are more SSP elements 108, for example more FMU files 104 in the SSP model file 106. If there is another SSP element 108 in the SSP model file 106, the method 200 returns to block 208 and the method 200 will continue similar to that previously described. If all SSP elements 108 of the SSP model file 106 have been processed by the cleanSSP process 205 in block 204, the method 200 advances to block 228 in FIG. 2C.

Figure 6A:
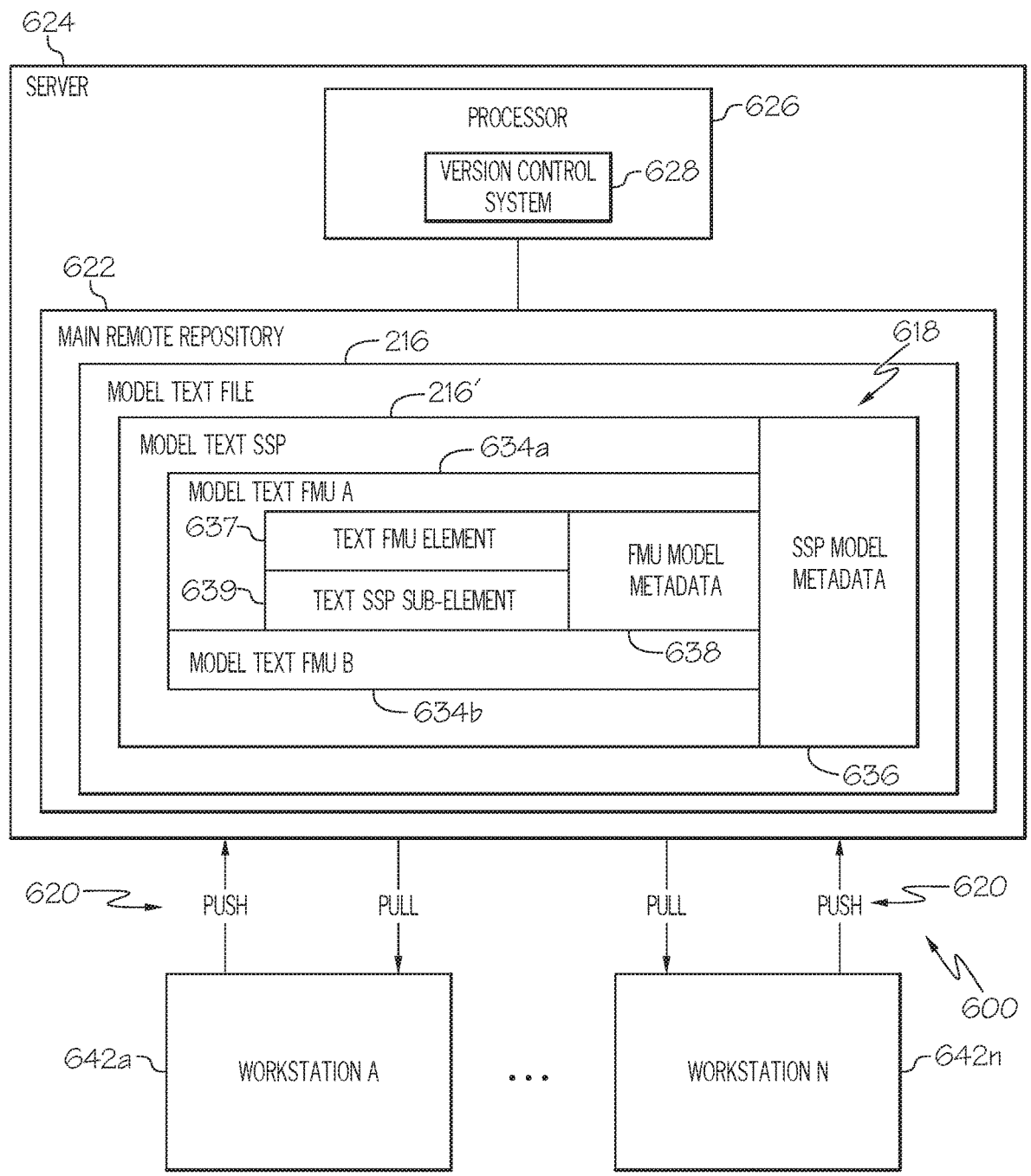
FIG. 6A is a block schematic diagram of an example of a system for controlling versions of a model file in accordance with an embodiment of the present disclosure.

In block 228, the version control system 102, 628 (FIG. 6A) is configured to use smart filters 602 (FIG. 6B) during a commit procedure 604 and a checkout procedure 606 as described in more detail with reference to FIG. 6B. FIG. 6A is an example of a system 600 for controlling versions of an SSP model file 106 in accordance with an embodiment of the present disclosure. The smart filters 602 include a cleanFMU script 608, a cleanSSP script 610, a smudgeFMU script 612 and a smudgeSSP script 614. During a commit procedure 604, the cleanFMU script 608 and cleanSSP script 610 are configured to convert non-text (binary) elements and sub-elements of SSP model files 106 to text-based elements similar to that described herein. During a check-out procedure 606, the smudgeFMU script 612 and the smudgeSSP script 614 are each configured to convert text-based elements, e.g., text FMU elements 637 and sub-elements, e.g., text SSP sub-elements 639 of model text files, such as model text file 216, to non-text (binary) elements and sub-elements, for example SSP elements 108 or SSP sub-elements 114 of a model file 120, such as SSP model file 106. The SSP model file 106 can then be modified.

Figure 6B:
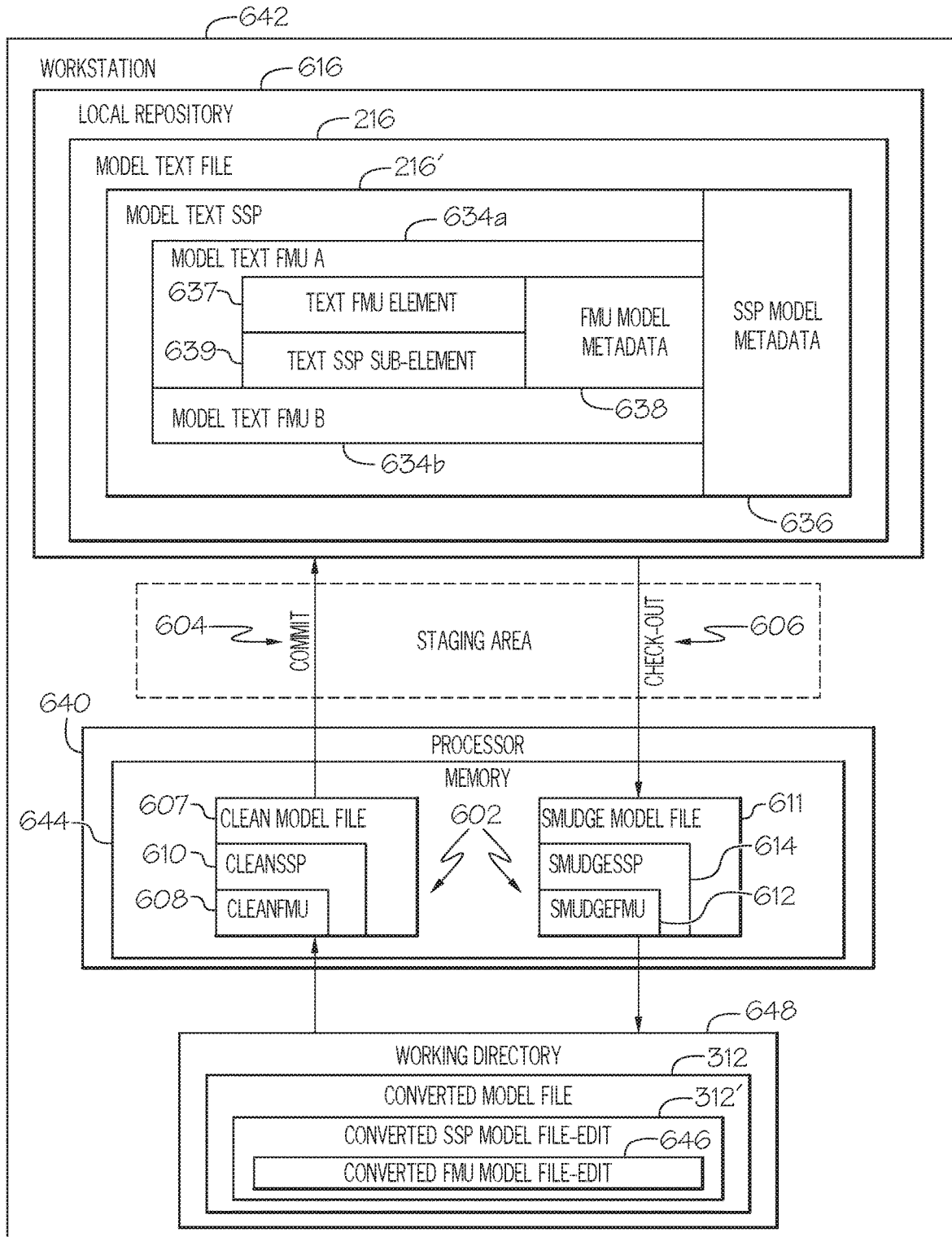
FIG. 6B is a block schematic diagram of an example of a workstation of the system of FIG. 6A in accordance with an embodiment of the present disclosure.

Referring back to FIG. 2C, in block 230, the model text file 216 corresponding to the SSP model file 106 is stored in a local repository, such as local repository 616 in FIG. 6B. Metadata 618 in FIG. 6A is associated with the model text file 216 is also stored on the local repository 616. The model text file 216 includes text files corresponding to SSP elements 108 and sub-elements 114 (FMU files 104 and FMU elements 112) and associated metadata 618.

In block 232, a diff operation is performed on the model text file 216 to detect any change to the particular element 108 and sub-elements 114 (FMU files 104 and FMU elements 112) by comparing the particular element 108 to a previous version of the particular element 108.

In block 234, a remote commit operation is performed. The remote commit operation 620 includes pushing the model text file 216 and associated metadata 618 (FIG. 6A) to a remote repository 622. The model text file 216 and the associated metadata 618 are stored on the remote repository 622. In accordance with an example, the remote repository 622 is a main remote repository embodied on a server 624. The server 624 also includes a processor 626. In the example in FIG. 6A, a version control system 628 is embodied in and runs on the processor 626.

In block 236, access is provided to remote users to view changes to the SSP model file 106 based on the model text file 216. This includes remote users that do not have smart filters 602 available.

Returning to block 218 in FIG. 2A, as previously described, if the particular element 108 is an FMU file 104, the method 200 advances to block 220 (FIG. 2B). In block 220, a cleanFMU process is performed. The FMU file 104 with a non-text (binary) format is converted to a text-based format. In accordance with an embodiment, converting the FMU file 104 to the text-based format includes performing the cleanFMU process 238 in block 220. Referring also to FIG. 4B, FIG. 4B is a pseudocode implementation of a cleanFMU process 238 in accordance with an embodiment of the present disclosure. As previously discussed, the SSP model file 106 (FIG. 1) includes one or more FMU files 104 and writing each element of the plurality of SSP elements 108 into the model text file 216 includes performing the cleanFMU process 238. An example of the cleanFMU process 238 is described in more detail with reference to blocks 240-254. FMU elements 112 with a non-text (binary) format are converted to a text-based format that permits detection of changes and permits version control. The cleanFMU process 238 includes using a conversion script, for example cleanFMU script 608 (FIG. 6B) to convert a particular FMU element 112 in a non-text format to a text-based format in response to the particular FMU element 112 including data in the non-text (binary) format.

In block 240, a particular SSP model file 106 sub-element 114, FMU file 104 or FMU element 112, is pre-processed and a temporal file is created. Similar to that previously described, this step is to produce a raw text based template, for example in Extensible Mark-up Language (.xml) format, that is configuration control friendly and includes already prepared various sections according to the number and content of the SSP elements 108. This raw text-based file is later populated with actual information. Preprocessing the SSP model file 106 also includes creating a zip file including the SSP model file 106. Preprocessing the particular sub-element 114 also includes creating a zip file including the particular sub-element 114.

In block 242, metadata associated with the particular sub-element 114 is retrieved. Examples of the metadata include but are not necessarily limited to a name of the particular sub-element 114, a date of creation, a date of modification, identification of a version, or identification of an author or editor.

In block 244, a format of the particular sub-element 114 is determined. In block 246, a determination is made whether the format of the particular sub-element 114 is text-based. If the format of the particular sub-element 114 is text based, the method 200 advances to block 248. In block 248, the particular sub-element 114 is written "as is" to the model text file 216. In accordance with an example, as previously described, the model text file 216 is an XML file. The model text file 216 is a text-based file that corresponds to the SSP model file 106.

If the format of the particular sub-element 114 is not text-based, the method 200 advances to block 250. In block 250, the particular sub-element is converted to text-based format that is version control friendly. In accordance with an embodiment, binary elements are converted to text by binary-to-text encoding. For example, Base64 or a similar binary-to-text application is used to perform binary-to-text encoding. In block 252, the particular sub-element 114 converted to the text-based format is written to the model text file 216.

In block 254, a determination is made whether there are more sub-elements 114 to be processed. If there are more sub-elements 114, the method 200 returns to block 242 and the method 200 continues similar to that previously described. If there are no more sub-elements 114 of the FMU file 104, the method 200 returns to block 226 in FIG. 2A. As previously described, in block 226, a determination is made whether there are more SSP elements 108 of the SSP model file 106 to process. If there are more SSP elements 108, the method 200 returns to block 208 and the method 200 continues using the next SSP element 108 similar to that previously described.

Figure 3A:
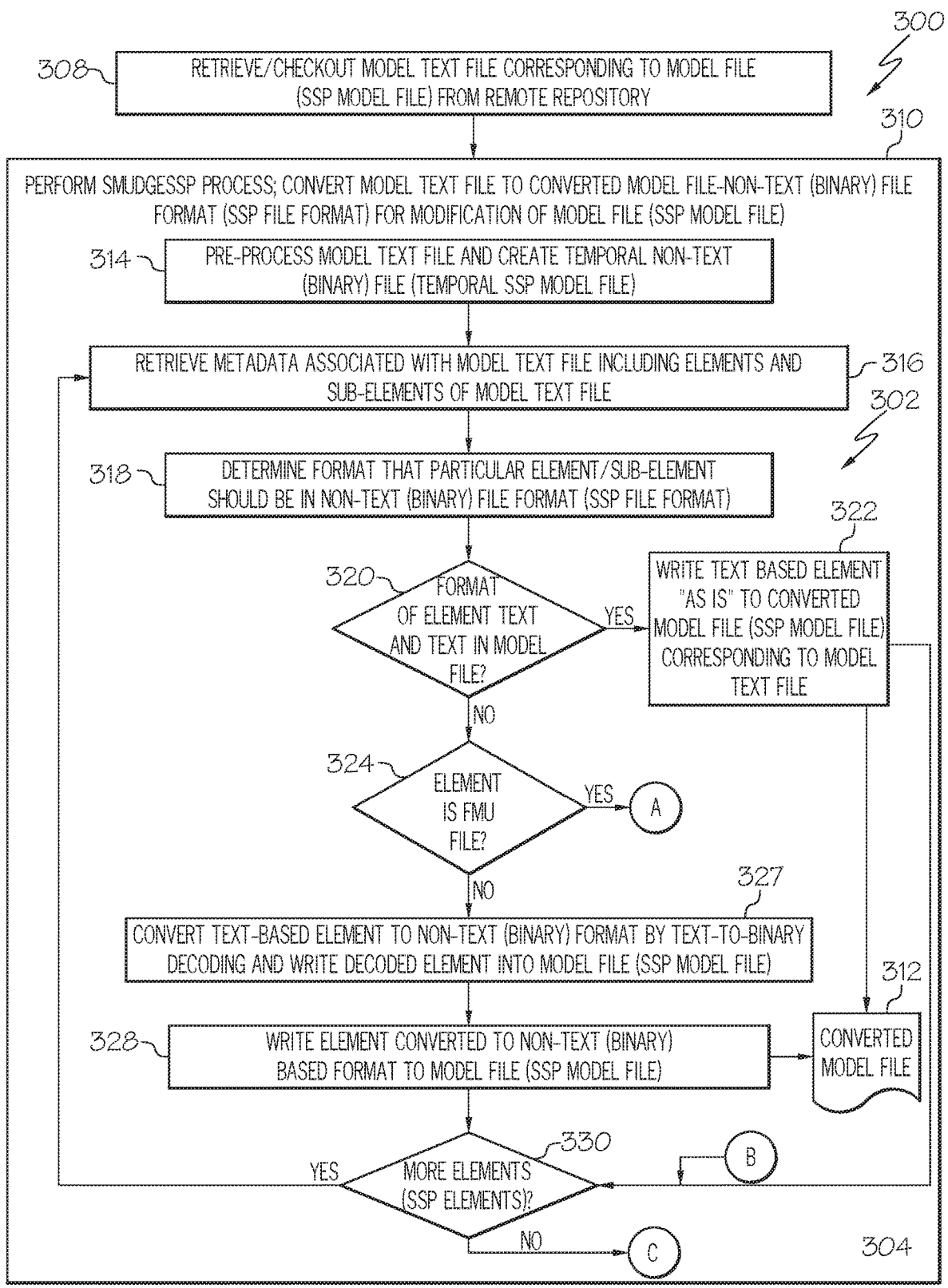
FIGS. 3A-3C are a flow chart of an example of a method for performing a smudge process for controlling versions of a model file in accordance with an embodiment of the present disclosure.
Figure 3B:
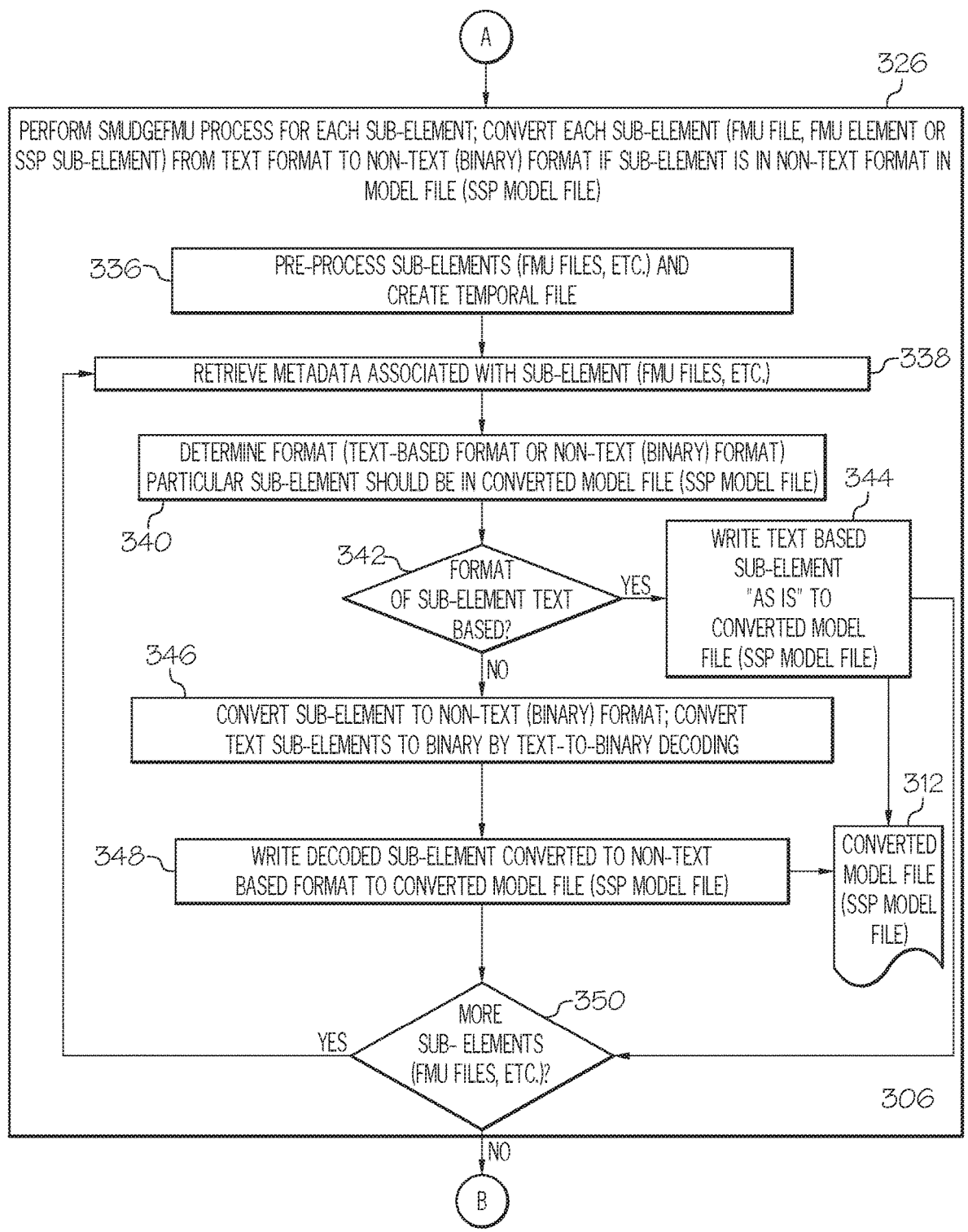
Figure 3C:
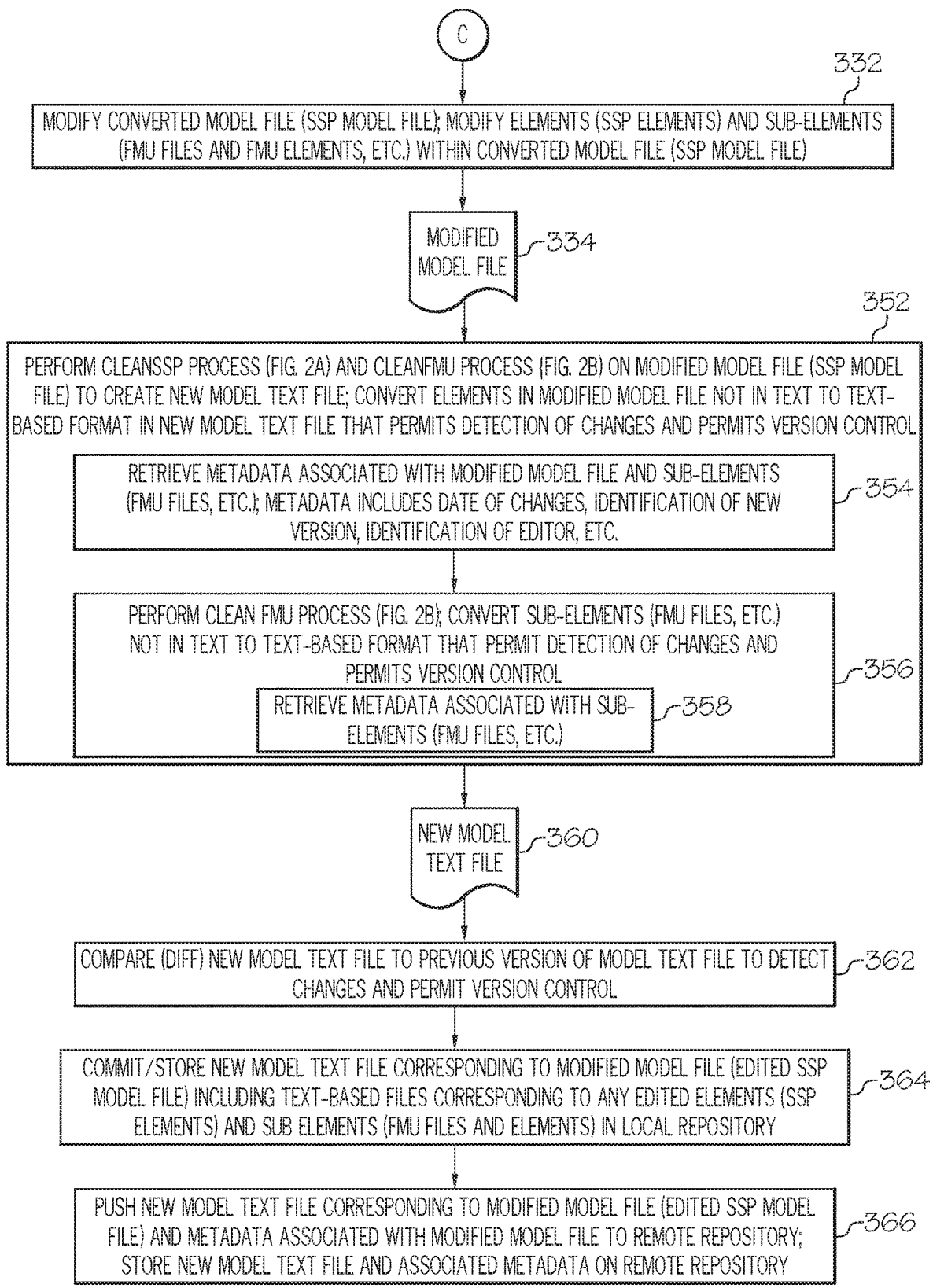

FIGS. 3A-3C are a flow chart of an example of a method 300 for performing a smudge process 302 for controlling versions of an SSP model file 106 in accordance with an embodiment of the present disclosure. Specifically, FIGS. 3A-3C show the application of the smudge process 302 to an SSP model file 106. However, the clean process 201 or smudge process 302 can also be applied to FMU files 104 or to a whole supplier in-package 100 similar to that illustrated in FIG. 1. In accordance with the exemplary embodiment described with reference to FIGS. 3A-3C, the smudge process 302 includes a smudgeSSP process 304 and a smudgeFMU process 306. The smudgeSSP process 304 is the opposite or inverse of the cleanSSP process 205 described with reference to FIG. 2A and the smudgeFMU process 306 is the opposite or inverse of the cleanFMU process 238 described with reference to FIG. 2B. Accordingly, the smudgeSSP process 304 includes converting the model text file 216 to an SSP model file 106 including non-text (binary) elements if the element is supposed to be in a non-text (binary format) in the SSP model file 106. The smudgeFMU process 306 includes converting each sub-element of the model text file 216 to a non-text (binary) format in the SSP model file 106 if the sub-element is supposed to be in a non-text (binary) format in the SSP model file 106. Sub-elements in the model text file 216 that are also text in the SSP model file 106 are written "as is" in SSP model file 106 as described in more detail below.

In block 308, a model text file, such as model text file 216, and associated metadata 618 (FIG. 6A) are retrieved or checked-out from a repository, such as remote repository 622 in FIG. 6A. In accordance with the example in FIGS. 6A-6B, the model text file 216 includes one or more text based representations of SSP model files 106, e.g., model text SSP 216' and one or more text based representations of FMU files 104, e.g., model text FMU A 634a, FMU B 634b, etc. The associated metadata 618 includes SSP model metadata 636 and FMU model metadata 638 associated with respective text FMU elements 637 and text SSP sub-elements 639. The SSP model metadata 636 will also contain FMU metadata 638 corresponding to all the FMU files 104 contained within the SSP model file 106 (FIG. 1). Nonetheless, FMU model metadata 638 is also shown in FIGS. 6A and 6B for completeness.

In block 310, the model text file 216 is converted to a converted model file 312. The converted model file 312 corresponds to the SSP model file 106. The converted model file 312 includes a file format configured for modifying the model text file 216. At least one element of the converted model file 312 includes data in a non-text (binary) format. In accordance with the exemplary embodiment in FIG. 3A, converting the model text file 216 to the converted model file 312 includes performing the smudgeSSP process 304 in block 310. Performing the smudgeSSP process 304 includes using a conversion script, for example smudgeSSP script 614 (FIG. 6B) to convert at least portions the model text file 216 to corresponding portions in the converted model file 312.

The smudgeSSP process 304 includes blocks 314-330 in FIG. 3A. Referring also to FIG. 5A, FIG. 5A is a pseudocode implementation of the smudgeSSP process 304 in accordance with an embodiment of the present disclosure.

In block 314, the model text file 216 is pre-processed and a temporal non-text (binary) file is created. In accordance with an example, the temporal non-text file is a temporal SSP model file. Similar to that described with reference to block 206, an empty .zip file is created as a first step then the different elements of the SSP model file 106 are added to the .zip file.

In block 316, metadata 636 and 638 (FIG. 6A) associated with the elements 637 and sub-elements 639 of the model text file 216 are retrieved.

In block 318, a format that a particular element 637 or sub-element 639 should be in the non-text (binary) file format (SSP file format) is determined. In block 320, if the format of a particular element 637 is text and is supposed to be text in the converted model file 312, the method 300 advances to block 322. In block 322, the text based particular element 637 is written "as is" into the converted model file 312. As previously described, the converted model file 312, in the example of FIG. 3A, corresponds to SSP model file 106 in FIG. 1.

In block 320, if the format of the particular element 637 is not supposed to be text in the converted model file 312, that is, the particular element 637 is supposed to be in a non-text (binary) format in the converted model file 312 (SSP model file 106), the method 300 advances to block 324. In block 324, a determination is made whether the particular element 637 is an FMU file 104. If the particular element 637 is an FMU file 104, the method 300 advances to block 326 in FIG. 3B. In block 326, a smudgeFMU process 306 is performed. The smudgeFMU process 306 will be described in more detail with reference to FIG. 3B below.

If the particular element 637 is not an FMU file 104, the method 300 advances to block 327. In block 327, the text-based particular element 637 is converted to a non-text (binary) format by text-to-binary decoding depending on the original encoding method, as an example, Base64 Decoding could be used for these purposes. In block 328, the particular element 637 converted to the non-text (binary) format is written to the converted model file 312.

In block 330, a determination is made whether there are more elements 637 (SSP elements 108) of the model text file 216 to process. If there are more elements 637, the method 300 returns to block 316 and the process proceeds similar to that previously described. If there are no additional elements 637, the method 300 advances to block 332 (FIG. 3C). In block 332, the converted model file 312 is modified according to user modeling needs to provide a modified model file 334.

Returning to block 324 (FIG. 3A), as previously described, a determination is made whether the particular element 637 is an FMU file 104 (FIG. 1). If the particular element 637 in block 324 is an FMU file 104 (FIG. 1), the method 300 advances to block 326 in FIG. 3B. In block 326, the text FMU element 637 or text SSP sub-element 639 (FIGS. 6A and 6B) is converted from the text format to the non-text (binary) format if the element 637 or sub-element 639 is supposed to be in the non-text format in the converted model file 312. The converted model file 312 corresponds to the original SSP model file 106. In accordance with an embodiment, converting elements 637 or sub-elements 639 of the model text file 216 includes performing a smudgeFMU process 306. As described herein, performing the smudgeFMU process 306 includes using a conversion script, for example smudgeFMU script 612 in the example in FIG. 6B, to convert at least portions (elements 637 and sub-element 639) of the model text file 216 to corresponding portions of the converted model file 312. Referring also to FIG. 5B, FIG. 5B is a pseudocode implementation of a smudgeFMU process 306 in accordance with an embodiment of the present disclosure.

In block 336, each element 637 or sub-element 639 is pre-processed and a temporal file is created. In block 338, metadata 638 associated with the elements 637 or sub-elements 639 is retrieved.

In block 340, a format that the particular model text SSP sub-element 639 or text FMU element 637 should be in the converted model file 312 is determined. For example, should the sub-element 639 be in a text-based format or a non-text (binary) format in the converted model file 312.

In block 342, a determination is made if the format of the sub-element 639 should be text-based in the converted model file 312. If the format of the sub-element 639 should be text-based in the converted model file 312, the method 300 advances to block 344. In block 344, the text SSP sub-element 639 from the model text file 216 is written "as is" in the converted model file 312.

If the format of the sub-element 639 is not supposed to be text-based in the converted model file 312 in block 342, the method 300 advances to block 346. In block 346, the text SSP sub-element 639 is converted to a non-text (binary) format. The text-based element 637 or sub-element 639 from the model text file 216 is converted to the non-text (binary) format by text-to-binary decoding. For example, Base64 decoding or other text-to-binary decoding may be used.

In block 348, the decoded non-text (binary) sub-element is added to the converted model file 312. In block 350, a determination is made whether there are more sub-elements 639 of the model text file 216 to process. If there are more sub-elements 639, the method 300 returns to block 338 and the method 300 will proceed similar to that previously described. If there are no more sub-elements 639, the method 300 returns to block 330 in FIG. 3A. As previously described, in block 330, if there are more SSP elements 108 of the model text file 216 to be processed using the smudgeSSP process 304, the method 300 returns to block 316 and the method 300 proceeds similar to that previously described. If there are no more SSP elements 108 to process in block 330, the method 300 advances to block 332 in FIG. 3C.

As previously described, in block 332, the converted model file 312 is modified or edited according to user modeling needs to create a modified model file 334. As also previously described, the converted model file 312 is in a format similar to the original SSP model file 106. Elements (SSP elements 108) and sub-elements (SSP sub-elements 114) are modified or edited within the converted model file 312 to create the modified model file 334. As previously described with respect to the example in FIG. 1, the SSP sub-elements 114 also include FMU files 104 and FMU elements 112.

In block 352, the modified model file 334 is converted to a new model text file 360. The new model text file 360 is used to detect changes in the new model text file 360 by comparing to a previous version of the model text file 216 and to control the different versions of the model text file 216. By detecting changes in the new model text file 360, changes in the SSP model file 106 are also detected because the new model text file 360 corresponds to the modified model file 334 with the non-text (binary) elements (SSP elements 108) and sub-elements (SSP sub-elements 114) converted to text-based elements 637 and sub-elements 639 in the model text file 216. Similar to that previously described with respect to the cleanSSP process 205 in FIG. 2A, any text-based elements or sub-elements in the modified model file 334 are written "as is" to the new model text file 360.

In accordance with an example, the modified model file 334 is converted to the new model text file 360 by performing a cleanSSP process 205 and cleanFMU process 238 similar to that described with reference to FIGS. 2A-2B.

In block 354, metadata associated with the modified model file 334 including SSP elements 108 and sub-elements 114 are retrieved. The metadata includes dates of changes, identification of the version of the modified model file 334, or identification of the editor. In accordance with an embodiment, the metadata further includes a specific model metadata, a specific model implementation, model usage and model execution metadata associated with the model file. A specific model metadata includes at least one of an element validity range, a fidelity, a plurality of ports and parameters, start and initial conditions, a physical domain, a validation level, a model execution environment, a set of solver settings, a group of external libraries, a set of real-time computation settings, an implementation language, an implementation tool, or a compiler.

In block 356, sub-elements 114 of the modified model file 334 that are not in a text format are converted to a text-based format that permits detection of changes and permits version control. In accordance with an example, the sub-elements 114 are converted using a cleanFMU process 238 similar to that described with reference to FIG. 2B. In block 358, metadata associated with the sub-elements 114 are retrieved.

In block 362, the new model text file 360 is compared to a previous version of the model text file 216 to detect changes and permit version control. In accordance with an example, a diff operation is performed to compare the new model text file 360 to the previous version or versions of the model text file 216. In accordance with an embodiment, the diff operation is performed by a processor 640 (FIG. 6B) of a workstation 642 (FIG. 6B). In accordance with another embodiment, the diff operation is performed by a processor 626 of a server 624 (FIG. 6A). In a further embodiment, the diff operation is performed by either the processor 640 of the workstation 642 or the processor 626 of the server 624.

In block 364, the new model text file 360 corresponding to the modified model file 334 (edited SSP model file 106) including text-based files corresponding to any edited SSP elements 108 and sub-elements 114 is stored in the local repository 616 (FIG. 6B). In accordance with an example, the new model text file 360 is stored in the local repository 616 by performing a commit procedure 604.

In block 366, the new model text file 360 corresponding to the modified model file 334 and associated metadata are pushed to the remote repository 622. The new model text file 360 and associated metadata are stored on the remote repository 622 (FIG. 6A).

FIG. 6A is an example of a system 600 for controlling versions of a model file 120, e.g., FMU file 104, SSP model file 106 or supplier in-package 100, etc. in accordance with an embodiment of the present disclosure. The system 600 includes a server 624 and one or more workstations 642a-642n that are configured to interface with the server 624. Referring also to FIG. 6B, FIG. 6B is a block schematic diagram of an example of a workstation 642 of the system 600 of FIG. 6A in accordance with an embodiment of the present disclosure. In an embodiment, the server 624 is configured to perform the method 200 in FIGS. 2A-2C and the method 300 in FIGS. 3A-3C. In another embodiment, at least one of the workstations 642a-642n is configured to perform the methods 200 and 300. In a further embodiment, the server 624 is configured to perform at least portions of the methods 200 and 300 and at least one of the workstations 642a-642n is configured at least portions of the methods 200 and 300.

The server 624 includes a processor 626 and a remote repository 622. A version control system 628 is embodied in and performed by the processor 626. In accordance with an embodiment, the version control system 628 is configured to perform at least some of the features of methods 200 and 300. As previously described, the remote repository 622 stores the model text file 216 and different versions of the model text file 216 including text-based elements 637 and sub-elements 639 of the model text file 216 and different versions of the model text file 216. The remote repository 622 also stores associated metadata 618 (SSP model metadata 636 and FMU model metadata 638) that is associated with the elements 637 and sub-elements 639 of the model text file 216 and different versions of the model text file 216. In accordance with an embodiment, the remote repository 622 is a main remote repository.

Each workstation 642a-642n includes a processor 640 and a memory 644. In accordance with an example, smart filters 602 are stored on the memory 644 and implemented by the processor 640 to perform the clean process 201 and smudge process 302 described herein. As previously described, the smart filters 602 include a clean model file script 607 which includes a cleanFMU script 608 and a cleanSSP script 610. The smart filters 602 also include a smudge model file 611 which includes a smudgeFMU script 612 and smudgeSSP script 614. As previously described, the cleanFMU script 608 and cleanSSP script 610 are configured to convert non-text (binary) elements and sub-elements of an SSP model file 106 to text-based elements during a commit procedure 604. The smudgeFMU script 612 and the smudgeSSP script 614 are each configured to convert text-based elements 637 and sub-elements 639 of a model text file 216 to non-text (binary) elements 108 and sub-elements 114 of an SSP model file 106 during a check-out procedure 606. The check-out procedure 606 is used to check-out a model text file 216 and edit the corresponding SSP model file 106 including SSP elements 108 and SSP sub-elements 114, some of which are in a non-text (binary) format. The converted model file 312 is edited (e.g., converted SSP model file-edit 312', converted FMU model file-edit 646, etc.) in a working directory 648 of the workstation 642 to create the modified model file 334 (FIG. 3C). The modified model file 334 is then converted back to a text-based file (new model text file 360) using the cleanSSP process 205 and cleanFMU process 238 in FIGS. 2A-2B similar to that previously described. The cleanSSP process 205 uses the cleanSSP script 610 to convert non-text based elements 108 to text-based elements, such as for example text FMU elements 637, of the model text file 216. The cleanFMU process 238 uses the cleanFMU script 608 to convert non-text based sub-elements 114 to text-based sub-elements, such as for example text SSP sub-elements 639, of the model text file 216.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for controlling versions of a model file, the method comprising:
   pre-processing, by a processor, the model file to create a temporal file comprising a text based template;
   determining, by the processor, a format of a particular element of a plurality of elements of the model file, the model file defining a model of a system;
   converting, by the processor, the particular element of the plurality of elements from a non-text format to a text-based format in response to the particular element comprising data in the non-text format; and
   writing, by the processor, the particular element converted to the text-based format to a model text file, wherein the model text file is a text-based version of the model file and the model text file is used to detect changes in the model file and to control different versions of the model file, wherein the model file comprises a system structure and parameterization (SSP) file and wherein writing each element of the plurality of elements into the model text file comprises performing a cleanSSP process and wherein performing the cleanSSP process comprises using a conversion script to convert the particular element from the non-text format to the text-based format in response to the particular element comprising data in the non-text format and the conversion script comprises a cleanSSP script.

2. The method of claim 1, further comprising writing the particular element of the plurality of elements into the model text file in response to the particular element comprising data in a text format.

3. The method of claim 1, further comprising retrieving metadata associated with the model file, wherein the metadata comprises an element name, an element description, a date of creation, a date of modification, an identification of a version, and an identification of an author.

4. The method of claim 3, wherein retrieving the metadata further comprises retrieving a specific model metadata, a specific model implementation, model usage and model execution metadata associated with the model file, wherein a specific model metadata comprises at least one of an element validity range, a fidelity, a plurality of ports and parameters, start and initial conditions, a physical domain, a validation level, a model execution environment, a set of solver settings, a group of external libraries, a set of real-time computation settings, an implementation language, an implementation tool, or a compiler.

5. The method of claim 1, further comprising performing a diff operation on the model text file to detect any change to the particular element by comparing to a previous version of the particular element.

6. The method of claim 1, further comprising storing the model text file in a local repository.

7. The method of claim 6, further comprising performing a remote commit operation, wherein performing the remote commit operation comprises:
   pushing the model text file and associated metadata to a remote repository; and
   storing the model text file and the associated metadata on the remote repository.

8. The method of claim 7, further comprising providing access to remote users to view changes to the model file based on the model text file, wherein the remote users comprise remote users that do not have smart filters available.

9. The method of claim 1, wherein the model file comprises a functional mockup unit (FMU) file and wherein writing each element of the plurality of elements into the model text file comprises performing a cleanFMU process.

10. The method of claim 9, wherein performing the cleanFMU process comprises using a conversion script to convert the particular element from the non-text format to the text-based format in response to the particular element comprising data in the non-text format, wherein the conversion script comprises a cleanFMU script.

11. The method of claim 1, further comprising:
   checking-out the model text file and associated metadata from a repository;
   converting the model text file to a converted model file, the converted model file comprising at least one element comprising data in the non-text format;
   modifying the converted model file to provide a modified model file; and
   converting the modified model file to a new model text file, wherein the new model text file is used to detect changes in the new model text file by comparing the new model text file to a previous version of the model text file and the new model text file being used to control the different versions of the model file.

12. The method of claim 11, wherein converting the model text file comprises performing a smudgeSSP process, and wherein performing the smudgeSSP process comprises using a conversion script to convert at least portions of the model text file to corresponding portions of the converted model file, wherein the conversion script comprises a smudgeSSP script.

13. The method of claim 11, wherein converting the model text file comprises performing a smudgeFMU process, and wherein performing the smudgeFMU process comprises using a conversion script to convert at least portions of the model text file to corresponding portions of the converted model file, wherein the conversion script comprises a smudgeFMU script.

14. The method of claim 1, further comprising:
determining if the particular element is a sub-element of the particular element;
converting the sub-element from the non-text format to the text-based format in response to the sub-element comprising data in the non-text format; and
writing the sub-element converted to the text-based format to the model text file.

15. A method for controlling versions of a model file, the method comprising:
receiving the model file, by a processor, that defines a model of a system, the model file comprising a plurality of elements;
pre-processing, by the processor, the model file to create a temporal file comprising a text based template;
determining, by the processor, a format of a particular element of the plurality of elements in the model file;
writing, by the processor, the particular element of the plurality of elements into a model text file in response to the particular element comprising data in a text format;
converting, by the processor, the particular element of the plurality of elements from a non-text format to a text-based format in response to the particular element comprising data in the non-text format; and
writing, by the processor, the particular element converted to the text-based format to the model text file, wherein the model text file is a text-based version of the model file and the model text file is used to detect changes in the model file and to control different versions of the model file, wherein the model file comprises a system structure and parameterization (SSP) file and wherein writing each element of the plurality of elements into the model text file comprises performing a cleanSSP process and wherein performing the cleanSSP process comprises using a conversion script to convert the particular element from the non-text format to the text-based format in response to the particular element comprising data in the non-text format and the conversion script comprises a cleanSSP script.

16. The method of claim 15, further comprising writing the particular element of the plurality of elements into the model text file in response to the particular element comprising data in a text format.

17. The method of claim 15, further comprising performing a diff operation on the model text file to detect any change to the particular element compared to a previous version of the particular element.

18. A system for controlling versions of a model file, the system comprising:
a processor;
a memory associated with the processor, the memory comprising computer readable program instructions that, when executed by the processor cause the processor to perform a set of functions comprising:
pre-processing the model file to create a temporal file comprising a text based template;
determining a format of a particular element of a plurality of elements of the model file, the model file defining a model of a system;
converting the particular element of the plurality of elements from a non-text format to a text-based format in response to the particular element comprising data in the non-text format; and
writing the particular element converted to the text-based format to a model text file, wherein the model text file is a text-based version of the model file and the model text file is used to detect changes in the model file and to control different versions of the model file, wherein the model file comprises a system structure and parameterization (SSP) file and wherein writing each element of the plurality of elements into the model text file comprises performing a cleanSSP process and wherein performing the cleanSSP process comprises using a conversion script to convert the particular element from the non-text format to the text-based format in response to the particular element comprising data in the non-text format and the conversion script comprises a cleanSSP script.

\* \* \* \* \*